United States Patent

Ashton et al.

[15] 3,684,197

[45] Aug. 15, 1972

[54] TALC BENEFICIATION

[72] Inventors: William H. Ashton, 10127 Bustleton Ave., Philadelphia, Pa. 19116; Robert S. Russell, 72 Darrow St., South River, N.J. 08882

[22] Filed: July 22, 1970

[21] Appl. No.: 57,360

[52] U.S. Cl.....................241/26

[51] Int. Cl.....................B02c 17/00

[58] Field of Search....................241/4, 26, 30

[56] References Cited

UNITED STATES PATENTS

| | | | |
|---|---|---|---|
| 2,305,404 | 12/1942 | Brown | 241/30 |
| 3,034,859 | 5/1962 | Gunn et al. | 241/4 X |
| 3,162,379 | 12/1964 | Cohn et al. | 241/4 |
| 3,162,381 | 12/1964 | Cohn et al. | 241/4 X |
| 3,414,201 | 12/1968 | Bixby | 241/4 |

*Primary Examiner*—Granville Y. Custer, Jr.
*Attorney*—Harold L. Warner and Robert L. Minier

[57] ABSTRACT

A novel method of preparing talc powder compositions by selectively exfoliating platy talc ore to produce a unique, low bulk-density, platy, high slip and lusterous powder base composition. The delamination of the platy talc ore is accomplished by employing a variety of forces to act on the particles in such a way that after delamination the length and width dimensions of the particles remain essentially unchanged, but the thickness of the particles are substantially reduced. Thus, the resulting particles are thinner but not smaller in the length-width than conventional talc particles, and their lubricity is heightened rather than decreased. The novel talc composition of the invention is particularly useful as a body powder.

3 Claims, No Drawings

TALC BENEFICIATION

CROSS REFERENCES TO RELATED APPLICATIONS

There are no related applications by this inventorship entity.

BRIEF SUMMARY OF THE INVENTION

The invention resides in the application of selective forces to a platy talc ore in such a manner as to achieve maximum delamination or peeling of the talc layers, while avoiding substantial diminuation in the planar dimension of the resultant thin talc particle.

The resulting laminar particles have relatively low bulk density compared to a commercial talc but relatively large particle size in the length-width dimension.

BACKGROUND OF THE INVENTION

Talc products have been used for many years for applying to the skin in the form of finely divided powder. The primary quality specification for such products are that they be substantially pure. Particles of foreign materials impart a rough or gritty feel to talc powders and can produce an irritating effect when applied to the skin.

Moreover, the form or shape of the talc particles themselves is also important. Of the three major talc forms occurring in nature, i.e. platy talc, fibrous talc, and granular talc, only platy talc is highly lubricious because of its naturally layered state. The platy talc particles easily slide over each other resulting in a natural lubricity.

In most commercial body powder compositions, platy talc is present in the range of 80 to 100 percent. The remaining amount is composed essentially of non-platy talc which can be fibrous and/or granular talc components.

The effect of these non-platy talc particles is so pronounced, that their presence in the platy talc concentrate in the amount of 4 to 6 percent can be ascertained simply by taking a sample of the powder and rubbing it between the fingers: a slight gritty feel is experienced as compared to a powder with 100 percent platy talc content.

Talc is a magnesium silicate mineral having natural flotability and by this property it can be separated from other minerals. Under certain conditions, this property is also used to separate the platy form of talc from other talc forms. Typical descriptions of the selective flotation of platy talc from non-platy talc and foreign materials can be found in U.S. Pat. No. 3,102,856 to Walter Eugene Chase and U.S. Pat. No. 3,102,855 to Whitman E. Brown et al.

Other methods for the beneficiation of platy talc are described as follows: U.S. Pat. No. 2,748,935 to Reschender discloses a process which utilizes surface active material without flotation; U.S. Pat. No. 3,414,201 deals with the use of electrostatic separation of platy talc from other forms applicable under certain conditions.

The platy talc concentrates obtained by the teachings of these and other related patents, however, can still be improved in their sheen or luster and lubricious feel to the touch as will be shown in our disclosure which follows:

It is an advantage of this invention that a high-grade powder base suitable for use as body powder can be produced. The requirements for body powders are quite different from those of talc powders suitable for other uses, such as cosmetic or pharmaceutic. In general, body powder requirements are high purity, whiteness, high lubricity or slip and the absence of abrasive components.

Although high purity is a primary requirement with all talc products intended for application to the skin because of possible irritational problems which can be caused by contaminants, it is even more obvious to insure against such problems in the case of infants with tender, and sensitive skin highly responsive to and unconditioned against such contaminants as carbonates, tremolite, chlorite, quartz, iron oxides, sulfides, etc.

Whiteness as well as reflectance and gloss is a visual property of talc very desirable in body powder as it appeals to the eye indicating purity and cleanness. However, this apparent property is not per se present in a talc product but is related to and is the visual expression of purity, grainsize distribution and crystallographic habits of the talc. The smoothness of the talc surfaces is an important factor in the overall effect of whiteness necessitating the employment of platy talc forms for use in body powders and the absence of irregular or deformed forms such as granular or fibrous talcs.

The slip or lubricity of a talc sample is essentially determined by the form or shape of the particles and their respective dimensions thereof. When a pinch of a talc sample is tested between the thumb and the forefinger by rubbing one finger with another, the forces applied by the fingers will be distributed along the surfaces of particles present between the fingers. If the particles are granular or fibrous, a rotational movement will occur to overcome the inertia in one plane. The particles in contact with the skin will rotate on the surface of the skin. Since neither the skin nor the particle surface are smooth enough, this movement of the particles with respect to the skin will create friction and possible scratching resulting in irritation of the skin.

When a platy talc is tested the same way, the plates will slide over one another. The series of platelets with smooth surfaces will orient their greatest surfaces normal to the force applied to overcome the inertia in a translational rather than in a rotational movement. The total friction resulting from the sum of translational movements is less than that of flesh in contact with flesh, and thus a lubricious, slippery property is felt.

Abrasiveness or grittiness is plainly undesirable because of scratching and resultant irritation on the skin of the baby. Grit consists of that portion of ground talc which is angular or oversize, particularly in thickness and includes both oversize and non-platy talc particles as well as mineral contaminants. Grit can occur as aggregates of talc and contaminants.

Platy talc concentrates obtained by conventional techniques for use as body powders contain less than 5 percent non-talc contaminants and about 1 to 20 percent non-platy forms of talc. The remaining 80—98 percent amount of talc will comprise individual plates or platelets characterized by such dimensions which define such particles as plates. The minimum requirements for a particle to be platy are the one-third to 1

9193 101049 0181 width to length and one-sixth to 1 thickness to length ratios.

Dimensionally, as the platiness is improved the average width to length ratio approaches unity, i.e., the surface of a particle has approximately equal length and width and the thickness decreases to one-sixth to one-eleventh of the thickness for conventional platy talcs and from one-twelfth to below for the platy talcs of this invention.

In theory, naturally occurring platy talc ore could be delaminated along the crystalline layers indefinitely so that the resulting platelet thicknesses are submicroscopic. However, in practice, the forces applied to the plates in the available apparatus are so undisciplined that inevitably three dimensional size reduction occurs. This means that as the thickness of the particles is reduced the planar dimensions of the particles are also reduced.

One property which may be used to manifest particle size is bulk density. The smaller the average particle size in a given sample, the lower the bulk density. However, the reduction of average particle size to produce low bulk density samples is only beneficial if the platy characteristics are retained or improved as discussed above, whereby increased softness and lubriciousness is obtained as the result of improved platiness. Simple, conventional, three-dimensional size reduction of particles, though reducing bulk density, destroys the platy character and therefore the lubricity of the talc.

Conventionally, talc is ground to a sufficient fineness to liberate the platy form of the talc from the other forms of talc and to permit flotation of different sorts usually with the employment of some reagents for beneficially separating the platy talc. Where the final product is to be used as a body powder, it is generally preferred to grind to a particle size of about −100 Tyler mesh or smaller, although flotation can be obtained with particles ground to only about −20 mesh.

The conventional grinding techniques using for example, ball mills, roller mills, jet mills and hammer mills, can produce almost any particle size desired in the proper range used for producing talc products. Platy talc forms can be comminuted by these conventional means to a certain degree but with both length-width reduction as well as thickness reduction.

DETAILED DESCRIPTION OF THE INVENTION

It is an advantage of this invention that low bulk-density, platy talc compositions with increased lubricity, luster and softness for use as high-grade body powder are obtained. These are novel and unobvious compositions. The novel and unobvious technique which is applied to reduce the thickness of the particles, while minimizing the length-width surface area reduction, is the selective exfoliation of platy talc ore.

Thus, the reduction of thickness of particles is desired while keeping the surface area essentially constant. The techniques of the prior art are unable to achieve this goal.

It is an advantage of this invention that platy talcs can be exfoliated along the natural planes of lamination, producing many thinner plates from each thicker schistose particle while the length to width ratio of each particle remains essentially constant. While any suitable means to apply the correct balance of forces can be used, the improved delamination of platy type ore of this invention is preferably carried out in a commercial apparatus called a Vibratory Mill, using grinding media of suitable shape, such as, for example, ½″ × ½″ ceramic cylinders.

The Sweco Vibra Energy Mill M—18, which was used in the process later described in the Examples, consists of a polyurethane lined steel bucket 14 inches deep by 17 inches diameter and having 200 lbs. weight of ½″ × ½″ aluminum oxide grinding cylinders as the media with a load capacity of 2.6 gal. of slurry. The bucket is mounted so that it is subject to a rapid vibratory motion in three dimensions through a distance of several mm, at a frequency of 1,200 cycles per minute.

In addition to the impact grinding which takes place, a great deal of shear force is placed on the laminar talc particles as a result of the back and forth sliding motion of the ceramic media. Furthermore, it is believed that these media tend to align themselves upright with the flat sides adjacent and the vertical axis parallel to the vertical axis of the mill. In this way the adjacent flat sides produce a large area for the sliding shear forces to act on the particles. In addition to this, the motion of the mill imparts a rotation to individual cylinders about their vertical axis which gives added areas of shear force.

As platy talc material is ground in the Vibratory Mill, it is subject to many times the number of contacts provided in a ball mill. Moreover since the distance through which the individual media move is only several mm and the contact force is less than in a cascading ball mill, the gentle but frequent contact action delaminates the schistose talc along its natural parting planes producing thinner and smoother talc plates with a decreased tendency to reduce the individual plates into smaller surface areas.

The talc composition made by the inventive process is unique in that it possesses low densities in combination with a surprisingly large particle size. Particle size as used here means planar plate area as opposed to plate thickness. Furthermore, the composition has an improved feeling of softness, and high luster or sheen when rubbed out on the skin.

The talc compositions of the invention preferably have bulk densities of about 14 to 17 and most preferably 14 to 16 lbs./ft.$^3$. However, they can be produced over a density range of about 12 to 22 lbs./ft.$^3$ while retaining the lubricity and textural softness imparted by the increased exfoliation of the talc plates.

The bulk density range of the compositions of the invention are significantly lower than that of talcs now available on the market for use as body powder. That is the commercial powders have a bulk density in the range of about 21 to 27 lbs./ft.$^3$ as measured on the Scott Volumeter.

In general the ratio of average thickness to average length of the gross quantity of platy talc particles in the compositions of this invention will range from one-twelfth to one-fiftieth, and preferably from one-twelfth to one-fortieth.

The combination of low average bulk density with relatively high average length to thickness rations fixes the average bulk characteristics of the novel talc composition of the invention. It is the interrelationship between the two which determines the unique and desirable properties of the composition.

It is to be noted that a most important feature of the invention is that the lower bulk density of the instant inventive talc composition permits packaging of the same weight of talc as current commercial varieties in a considerably larger container.

Thus, an important economic advantage is gained in being able to market a superior grade talc in a larger container at the same price as competitive currently available commercial grades.

It is possible to reduce the bulk densities of talcs to about 16 lbs./ft.$^3$ with convention methods such as, for example, grinding and greatly reducing the particle size. However, when this is done the increase in fines causes a pronounced grainy, floury feel and a loss of lubricity and luster. This follows from the fact that the large surface area of the individual platelets has been lost because of the uncontrolled intense grinding action.

The invention is further illustrated by the following examples.

EXAMPLE 1.

In order to demonstrate that talc powder compositions prepared in accordance with the process of the invention have a large particle size measured as plate area, and reduced thickness which is defined as the distance between the upper and lower surfaces of particles when the talc particles are in their most stable gravitational position, the following experiment was carried out in order to measure the average thickness of the talc particles which is an important property of the novel compositions of the invention.

A laminar schistose talc ore containing all the natural constituents was dry-ground to a suitable particle size feed such as less than 4 mesh but greater than 60 mesh after which it is subjected to wet grinding in a Vibra Mill. The platy talc content was then concentrated by froth flotation in a sub-aeration flotation cell, No. KC—52623—1. Froth flotation disclosed in U.S. Pat. No. 3,102,855 to W. E. Brown et al and U.S. Pat. No. 3,102,856 to W. E. Chase can be applied to separate the laminated platy talc crystals from the non-platy particles and non-talc contaminants either with or without the use of reagents.

To facilitate the measurement of the "average thickness," the particles were segregated into size groups based on wet screening and sedimentation in water. Three groups were formed as follows:

149 TO 74 MICRONS

74 TO 44 MICRONS and

44 TO 10 MICRONS

Each size-group was then subjected to the procedure hereafter described.

A thin film of the talc particles was dusted onto the surface of distilled water, and whipped gently with the edge of a small spatula so as to form a continuous single-layer of talc crystals floating in their most stable position. Since the crystals are platy, i.e. flat, their most stable position is when the surfaces of greatest cross-sectional area are parallel to the surface of the water.

A section of this mono-layer, continuous film was then picked up on the surface of a clean microscope glass slide by gently submerging the slide beneath the film and carefully raising it up through the talc-layer. The talc layer from the surface of the water was transferred onto the glass slide by this process after which it was dried.

A precisely trimmed 10 sq. cm. area of the film was microphotographed to determine voids or holes in the visibly continuous film. The determination was made by projecting the photographic image onto a sheet of No. 341—10 Dietzgen graph paper. The void area was determined by counting squares and subtracting their sum from the total area of the projected image.

The weight of talc on the slide was determined to one-tenth milligram on a micro-balance.

The average thickness of the talc particles was calculated from the above described data as follows:

$$\text{Volume } (V) = \frac{\text{weight } (w)}{\text{density } (d)}$$

$$\text{Volume } (V) = \text{thickness } (t) \times \text{area } (a)$$

$$\therefore t = \frac{w}{ad}$$

$$t \times 10^{-4} = \text{thickness } (t) \text{ in microns}$$

where $d$ = density of talc in grams/cc = 2.7

$w$ = weight of talc on slide in grams $a$ = actual area covered by talc in cm$^2$ $t$ = average thickness of talc in cm Two finished talc products were measured according to the described procedure. The powders were made up so that the distribution of the projected areas (projected area being the surface area observed when viewing the particles in a state of rest in a direction parallel to the thickness) was the same but the average thickness of the particles varied.

Talc A was a regular commercial talc with 25.3 lbs./ft.$^3$ bulk density containing 33.33 percent of talc plates ranging in size from 10 to 44 microns diameter, 33.33 percent of 44 to 74 microns and 33.33 percent of 74 to 149 microns fractions of platy talc.

Talc B was the talc obtained according to the above-described process and had a 16.2 lbs./ft.$^3$ bulk density and contained 33.33 percent of 10—44 microns, 33.33 percent of 44 to 74 microns and 33.33 percent of 74 to 149 microns fractions of platy talc.

The measurements are summarized in Table I.

TABLE I

| Type of Talc | Plate Diameter Range* Microns | Talc Area | Talc Weight grams | Average Thickness microns | Ratio of Average Plate Diameter to Average Thickness |
|---|---|---|---|---|---|
| A | 10 to 44 | 8.02 | .0075 | 3.5 | 1/8 |
| B | 10 to 44 | 7.62 | .0042 | 2.0 | 1/13 |
| A | 44 to 74 | 8.36 | .0152 | 6.7 | 1/9 |
| B | 44 to 74 | 7.86 | .0058 | 2.7 | 1/22 |
| A | 74 to 149 | 7.78 | .0213 | 10.1 | 1/11 |
| B | 74 to 149 | 7.60 | .0097 | 4.2 | 1/27 |

* The sizes of the particles in each range were determined by wet screening using U.S. Standard Sieves.

The foregoing data well illustrates the decrease in bulk density of a talc powder matrix with decrease in average thickness of particles; while the areas of the actual surfaces are essentially the same, the thicknesses substantially differ. It is clear that Talc B is composed of thinner plates which is a result of the novel high delamination process of the present invention.

The relationship between the decreased bulk densities and thinness of platy talc, while the surface areas are essentially unreduced in the definite reason for the increased lubricity, luster and softness which characterize the compositions of the invention.

The ratios of average thickness to average length calculated within the above group fractions for the subject talc are approximately one-thirteenth, one twenty-second, one twenty-seventh respectively; for the commercial talc used as a standard the corresponding ratios are one-eighth, one-ninth, one-eleventh.

Although variations will occur from sample to sample, on the average a twofold reduction in average thickness to average length is obtained with the compositions of the invention.

Samples of the talc compositions of the invention were observed under the microscope. The plates vary individually as to shape, however, on the average they can be characterized as particles with equal surface dimensions, i.e., the average length and average width of particles are essentially the same.

EXAMPLE 2.

2.724 gms. (6 lbs.) of Vermont schistose talc comprising a 2 percent portion with a particle size of less than 44 microns and larger than 250 microns was mixed with 7,850 cc. of water, the mixture resulting in a 25.8 percent by weight solids slurry, which was then ground in a Vibra Mill for 20 minutes as described in Example 3.

An additional wet grind similar to the one described above was also prepared. The slurries were combined and transferred to the flotation cell. The water content of the slurry was so adjusted that the solids content was approximately 8.6 percent after which the following reagents were added in the proportions indicated below:

| Reagent | Grams of Reagents | Grams/lbs.talc | lbs./ton of talc |
|---|---|---|---|
| HCl | 2.76 | 0.227 | 1.00 |
| Dowfroth 250(1) | .168 | 0.014 | .062 |
| Deceresol Surfactant-18(2) | 0.640 | 0.054 | 0.24 |

(1) propylene glycol methyl ether—having general formula $CH_3$—(O—$C_3H_6$)$_x$— OH and average molecular weight of 250 (Dow Chemical Co.)

(2) Disodium N-octadecyl (American Cyanamid Co.) Sulfo-succinamate

After reagent addition the slurry was mixed for 5 minutes, then floated and the purified talc collected while keeping the original liquid level of the cell constant.

Using the purified talc obtained above, the flotation was repeated keeping the same liquid level as before, but no reagent was added.

The talc concentrate was again ground in the Vibra Mill for 20 minutes with sufficient water added to have the slurry level just to the top of the grinding media bed, followed by a flotation step with 1.36 gm. of HCl. 0.084 gm. of Dowfroth 250 and 0.32 gm. of Deceresol 18 added while the slurry level was kept at about 15 gal. with water, followed by filtration of the float concentrate to a wet filter cake which was then dried in a hot oven at 250° F. and dispersed through a 40 mesh vibrating screen.

The product obtained has an increased feel of unctousness, a high luster of sheen and it appears whiter by visual observation. Its physical properties were measured as were those of a commercial body talc which was used as a standard, the commercial body talc having been prepared from the same talc ore but not by the process of the present invention. The data obtained are summarized below in Table II.

TABLE II

| | Example 2 Talc | Commercial Talc |
|---|---|---|
| Bulk Density | 14–16 lbs./ft.$^3$ | 23–25 lbs./ft.$^3$ |
| Graduate Volume - which is a measure of the volume of 2-oz. of talc in the maximum lofted state and is compacted on the Numico Tap-Pack instrument using a 250 cc graduated cylinder. | | |
| Maximum Volume | 210 cc | 130 cc |
| Minimum Volume | 120 cc | 70 cc |
| Average Volume | 165 cc | 100 cc |
| Solid Volume of 2-oz. talc | 21 cc | 21 cc |
| Volume of Air in Average Volume Matrix | 144 cc | 79 cc |
| Particle Size | | |
| % through 100 mesh (149 microns) | 98.6 | 100 |
| % through 200 mesh (74 microns) | 79.0 | 99.1 |
| % through 325 mesh (44 microns) | 62.2 | 89.5 |

The average particle thickness is described below in accordance with the procedure set forth earlier in the disclosure:

| Plate Diameter Range | +149 Microns | 149–74 Microns | 74–44 Microns | 44–10 Microns | −10 Microns |
|---|---|---|---|---|---|
| Weight % | 1.4% | 19.0% | 16.8% | 44.3% | 17.9% |
| Thickness (Average) | | 4.2 microns | 2.7 microns | 2.0 microns | |

The above data show that the talc produced with the new method has about 40 percent less bulk density and yet is actually a larger particle size than the commercial talc used as the standard for comparison. Because of its loft, which is due to the thin platy character, it has an element of softness not present in the commercial talc.

EXAMPLE 3

Six pounds of talc ore was crushed on a "Chipmunk" Jaw crusher to ¼ inch particle size and below. The particle size was further reduced on a Roller Mill to (100 percent through 18 mesh). The material was then transferred to the Sweco Vibra Mill type M—18 having 2.6 gal. capacity and slurried with 18 lbs. of water after which it was ground for 20 minutes. The ground slurry was then deslimed (fines removed) by passing it twice through a Tolhurst centrifuge at a concentration of 5 percent by weight solids, at 20 gal./min. and at a centrifuge speed of 300 RPM. By this method 10 percent of the fines of approximately 10 microns diameter and below were removed. (The talc ore was Italian Schistose).

In a Denver sub-aeration flotation cell 12 lbs. of deslimed talc was agitated with 127 lbs. (15 gal.) of water for two minutes and the following reagents in the proportions indicated below were added.

| Reagent | Grams/lbs. | lbs./ton |
|---|---|---|
| HCl | 0.227 | 1.00 |
| Dowfroth 250 | 0.014 | .06 |
| Deceresol | 0.054 | .24 |

The mixing was continued for about 5 minutes then with the air turned on, the rougher stage froth was collected to depletion. The tailings were drained and the collected rougher froth transferred back to the flotation cell, diluted with 15 gal. of water and agitated for 5 minutes. The air was turned on, the cleaner froth collected to depletion, filtered, and dried at 250° F. in hot air oven.

Several properties of the resultant talc and a commercial talc were measured for comparison purposes as follows in Table III.

TABLE III

| | Example 3 Talc | Commercial Talc (as std) |
|---|---|---|
| Bulk Density | 18–22 lbs./ft.$^3$ | 23–25 lbs./ft$^3$ |
| % through 100 mesh | 99.8 | 100.0 |
| % through 200 mesh | 77.0 | 99.1 |
| % through 325 mesh | 56.2 | 89.5 |

The average particle thickness of the Example 3 talc were calculated as follows:

| Plate Diameter Range | +149 microns | 149–74 Micron | 74–44 Micron | 44–10 Micron | –10 Micron |
|---|---|---|---|---|---|
| Weight Percent | 0.2% | 22.8 | 20.8 | 46.3 | 9.9 |
| Average thickness | | 4.6 microns | 3.4 microns | 2.5 microns | |

The product was further characterized by an increased feeling of unctuousness of slickness, a high luster or sheen and softness.

The talc rock of this example as well as the others is naturally schistose or laminar in structure and small particles are composed of a multiplicity of flat talc platelets stacked together analogously with a deck of cards. In the process of this invention the talc ore is ground under high shear forces but low grinding forces which divide these laminar particles into unusually thin individual platelets, but do not shred the platelets into smaller particles and thus produces a more lustrous and lubricious talc product. Also the data shows that a large particle size obtains along with removal of the majority of the very fine particles.

EXAMPLE 4

1,600 gm. of talc was mixed with 8 liters of water and ground for 20 minutes in the Vibra Mill. One liter, with 200 gms. talc content of slurry was diluted to 2,400 cc with water and floated in the Fagergren Lab Flotation cell with no reagent added. Flotation was repeated. Vermont Schistose talc).

When sufficient amount of the twice floated talc was collected, 692 gms. was mixed with 8 liters of water and ground in the Vibra Mill for 20 minutes. 1.125 liter of the resultant slurry was taken from the mill and diluted to 2,400 cc., then floated in the Fagergren cell with no reagent added. Flotation was repeated.

The twice floated talc was collected, 692 gms. was mixed with 8 liters of water and ground in the Vibra Mill for 20 minutes. One and 125 hundredths liters of slurry were taken from this and diluted to 2,400 cc, then floated to the Fagergren cell with no reagent added. Flotation was repeated three more times using 2,400 cc of water.

The float concentrate from the last flotation was filtered to a wet filter cake and dried in a hot air oven at 250° F. The dried cake was dispersed by sieving through a 40 mesh vibrating screen.

Physical properties of the resulting products were measured and the results summarized below in Table IV.

TABLE IV

| | |
|---|---|
| Bulk Density: | 14–12 lbs./ft.$^3$ |
| Particle Size: | |
| % through 100 mesh | 95.8 |
| % through 200 mesh | 79.0 |
| % through 325 mesh | 67.8 |

The average particle thicknesses were as follows:

| Plate Diameter Range | +149 Microns | 149–74 Microns | 74–44 Microns | 44–10 Microns | –10 Microns |
|---|---|---|---|---|---|
| Weight Percent | 4.2 | 16.8 | 11.2 | 42.9 | 24.9 |
| Average thickness | | 3.1 microns | 2.5 microns | 1.4 microns | |

We claim:

1. A method of producing a composition consisting essentially of a plurality of platy talc particles having an average bulk density of from 12 to 22 lbs./ft.$^3$ and an average thickness to length ratio of from one-twelfth and below which comprises subjecting a Schistose talc ore under controlled conditions to a minimum of impact forces and a maximum of sliding shear forces until talc of the described characteristic is obtained.

2. A method according to claim 1 except that the talc composition has the characteristics of a bulk density of from 14 to 17 lbs./ft.$^3$ and an average thickness to length ratio of from one-twelfth to one-fiftieth.

3. A method according to claim 1 wherein said controlled conditions are exerted upon said ore by means of the action of a Vibratory Mill which operates in the wet condition.

* * * * *

PC-1050
(5/69)

UNITED STATES PATENT OFFICE
CERTIFICATE OF CORRECTION

Patent No. 3,684,197 Dated August 15, 1972

Inventor(s) William H. Ashton and Robert S. Russell

It is certified that error appears in the above-identified patent and that said Letters Patent are hereby corrected as shown below:

In Column 2, line 42, "surface" should read --- surfaces ---.

In Column 3, line 7, "thickness" should read --- length ---.

In Column 4, line 64, "rations" should read --- ratios ---.

In Column 5, line 11, "convention" should read --- conventional ---.

In Column 6, Table I, "Talc Area" should read --- Talc Area $_{cm2}$ ---.

In Column 7, line 11, "in" should read --- is ---.

In Column 8, line 9, "has" should read --- had ---.

Signed and sealed this 15th day of May 1973.

(SEAL)
Attest:

EDWARD M.FLETCHER,JR.
Attesting Officer

ROBERT GOTTSCHALK
Commissioner of Patents